United States Patent
Haskara et al.

(10) Patent No.: US 11,247,571 B2
(45) Date of Patent: Feb. 15, 2022

(54) INTELLIGENT ENERGY MANAGEMENT SYSTEM FOR A VEHICLE AND CORRESPONDING METHOD

(71) Applicant: GM GLOBAL TECHNOLOGY OPERATIONS LLC, Detroit, MI (US)

(72) Inventors: Ibrahim Haskara, Macomb, MI (US); Bharatkumar Hegde, Bloomfield Hills, MI (US); Insu Chang, Troy, MI (US); Chen-Fang Chang, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 295 days.

(21) Appl. No.: 16/686,434

(22) Filed: Nov. 18, 2019

(65) Prior Publication Data

US 2021/0146790 A1   May 20, 2021

(51) Int. Cl.
| | |
|---|---|
| *B60L 50/60* | (2019.01) |
| *B60L 58/10* | (2019.01) |
| *G06Q 30/02* | (2012.01) |
| *G05B 13/04* | (2006.01) |
| *G05B 13/02* | (2006.01) |
| *B60L 53/60* | (2019.01) |

(52) U.S. Cl.
CPC .............. *B60L 50/60* (2019.02); *B60L 53/60* (2019.02); *B60L 58/10* (2019.02); *G05B 13/0265* (2013.01); *G05B 13/041* (2013.01); *G06Q 30/0207* (2013.01)

(58) Field of Classification Search
CPC ........................................................ B60L 50/60
See application file for complete search history.

(56) References Cited

U.S. PATENT DOCUMENTS

| | | | | |
|---|---|---|---|---|
| 7,380,921 B2 * | 6/2008 | Nanjo | .................. | B41J 2/17513 347/84 |
| 7,397,149 B2 * | 7/2008 | Seddiki | .................. | B60L 15/20 307/62 |

(Continued)

FOREIGN PATENT DOCUMENTS

| CN | 106385194 B | * | 9/2018 |
| CN | 109870162 A | * | 6/2019 |

(Continued)

*Primary Examiner* — Alex C Dunn
(74) *Attorney, Agent, or Firm* — Quinn IP Law

(57) ABSTRACT

An energy management system for a vehicle is disclosed. The vehicle includes one or more power sources configured to provide power to one or more recipients. The system includes a controller configured to determine an arbitration vector based at least partially on a state vector and an initial transformation function. The arbitration vector is determined as one or more points for which the initial transformation function attains a maximum value. The controller is configured to determine a current reward based on the arbitration vector and the state vector, the current reward being configured to minimize energy loss in the power sources. The controller is configured to determine an updated transformation function based at least partially on the initial transformation function and a total reward. The controller is configured to arbitrate a power distribution based in part on the updated arbitration vector.

17 Claims, 2 Drawing Sheets

(56) References Cited

U.S. PATENT DOCUMENTS

| | | | | |
|---|---|---|---|---|
| 8,543,261 B2 * | 9/2013 | Anderson | | B60W 30/09 |
| | | | | 701/3 |
| 9,568,901 B2 * | 2/2017 | Hooshmand | | G05B 15/02 |
| 9,587,954 B2 * | 3/2017 | Gusikhin | | G06Q 10/06311 |
| 9,731,755 B1 * | 8/2017 | Moshchuk | | B62D 6/00 |
| 9,862,397 B2 * | 1/2018 | Meyer | | B61L 27/0016 |
| 10,126,136 B2 * | 11/2018 | Iagnemma | | G05D 1/0088 |
| 10,303,166 B2 * | 5/2019 | Iagnemma | | B60W 50/14 |
| 10,309,792 B2 * | 6/2019 | Iagnemma | | G05D 1/0214 |
| 10,829,116 B2 * | 11/2020 | Iagnemma | | B60W 10/18 |
| 10,948,919 B2 * | 3/2021 | Zhu | | G05D 1/0238 |
| 10,969,749 B2 * | 4/2021 | Backstrom | | D21G 9/0009 |
| 2010/0094786 A1 * | 4/2010 | Gupta | | G06N 20/00 |
| | | | | 706/12 |
| 2014/0350743 A1 * | 11/2014 | Asghari | | G05B 13/048 |
| | | | | 700/297 |
| 2016/0276842 A1 * | 9/2016 | Shizuno | | B60L 58/12 |
| 2017/0310140 A1 * | 10/2017 | Asghari | | H02J 3/32 |
| 2019/0061535 A1 * | 2/2019 | Bridges | | B60L 53/18 |
| 2020/0025402 A1 * | 1/2020 | Bell | | G05D 23/1904 |
| 2020/0117956 A1 * | 4/2020 | Wayne | | G06K 9/6256 |
| 2020/0376927 A1 * | 12/2020 | Rajaie | | B60H 1/00885 |

FOREIGN PATENT DOCUMENTS

| | | | | | |
|---|---|---|---|---|---|
| CN | 107425762 B | * | 10/2019 | | |
| DE | 102019216445 A1 | * | 4/2021 | | B60L 50/60 |
| DE | 102019216454 A1 | * | 4/2021 | | B60W 50/0097 |
| EP | 1359049 A1 | * | 11/2003 | | B60M 3/00 |
| FR | 3036865 A1 | * | 12/2016 | | B60L 50/16 |
| GB | 2564668 A | * | 1/2019 | | G06K 9/6262 |
| JP | 2009096365 A | * | 5/2009 | | |
| WO | WO-2018104850 A1 | * | 6/2018 | | B60W 20/11 |
| WO | WO-2019185714 A1 | * | 10/2019 | | B60W 30/18163 |
| WO | WO-2021078390 A1 | * | 4/2021 | | B60W 10/184 |
| WO | WO-2021078391 A | * | 4/2021 | | B60L 15/2045 |
| WO | WO-2021093953 A1 | * | 5/2021 | | B60W 20/12 |

* cited by examiner

INTELLIGENT ENERGY MANAGEMENT SYSTEM FOR A VEHICLE AND CORRESPONDING METHOD

INTRODUCTION

The present disclosure relates to an energy management system for a vehicle and corresponding method. The use of mobile platforms employing multiple sources of energy has greatly increased over the last few years. For example, a vehicle may include an internal combustion engine and a supercapacitor as sources of energy. A vehicle may further include a rechargeable energy storage unit with multiple battery packs, for storing and releasing electrochemical energy as needed during a given operating mode. The energy may be directed towards multiple uses, such as propulsion, heating or cooling a cabin compartment, powering vehicle accessories and other uses.

SUMMARY

Disclosed herein is an intelligent energy management system for a vehicle having one or more power sources and corresponding method. The energy management system includes a controller configured to receive a total power demand ($P_D$) varying in real-time. The total power demand ($P_D$) may originate from one or more recipients. The controller is in communication with one or more sensors that are configured to obtain respective sensor data relative to the power sources. The controller includes a processor and tangible, non-transitory memory on which instructions are recorded. The energy management system is configured to incorporate current and future states of the power sources to allocate optimal power distribution, in terms of delivering multiple schedulable loads from multiple power sources. The energy management system allows for balancing and blending of energy consumption optimization and long-term component health in real-time.

Execution of the instructions by the processor causes the controller to obtain a state vector based in part on respective sensor data obtained by one or more sensors. An initial transformation function is selected. The controller is configured to determine an arbitration vector based at least partially on the state vector and the initial transformation function, the arbitration vector being determined as one or more points for which the initial transformation function attains a maximum value. The controller is configured to determine a current reward based on the arbitration vector and the state vector. The current reward may be configured to minimize energy loss in the power sources. A total reward is determined as a sum of the current reward and a forecasted reward over a selected horizon size. The controller is configured to determine an updated transformation function based at least partially on the initial transformation function and the total reward. An updated arbitration vector is obtained based at least partially on the updated transformation function. The controller is configured to arbitrate a power distribution based in part on the updated arbitration vector.

The current reward may be configured to minimize energy loss in the one or more power sources, with the power sources each providing a respective power ($P_S$). The controller may be configured to arbitrate between the one or more power sources such that ($P_D = \Sigma a_i P_{S_i}$), with $P_D$ being the total power demand and a being a component of the updated arbitration vector $A = [a_i \ldots]$.

The current reward may be configured to minimize at least an electrical loss factor, a capacity loss factor ($\Delta Q_{loss}$) and a charge depletion factor ($\Delta SoC$), the charge depletion factor being defined as a difference between a final state of charge and an initial charge of charge of the battery module. The power sources may include at least one battery module defining a current to capacity ratio ($I_b/Q_b$). The current reward may include a current limiting factor ($SL_{I_b}$) based in part on the current to capacity ratio $$\left(\frac{I_b}{Q_b}\right),$$

a first calibration parameter (m) and a second calibration parameter ($\overline{C}_{rate}$) such that $$SL_{I_b} = (|I_b/Q_b| - \overline{C}_{rate}) \cdot \left(\frac{|I_b/Q_b|}{\overline{C}_{rate}}\right)^m,$$

when $[|I_b/Q_b| > \overline{C}_{rate}]$ and $SL_{I_b} = 0$, when $[|I_b/Q_b| < \overline{C}_{rate}]$.

The current reward may include respective normalizing factors (w) for an electrical loss factor ($E_{loss}$), a capacity loss factor ($\Delta Q_{loss}$), the current limiting factor ($SL_{I_b}$) and a charge depletion factor ($\Delta SoC$) such that the current reward (r) is determined as: $r = -(\omega_1 \cdot E_{loss} + \omega_2 \cdot \Delta Q_{loss} + \omega_3 \cdot \Delta SoC + \omega_4 \cdot SL_{I_b})$.

The total power demand includes respective power requests from a plurality of recipients, including a propulsion power request ($P_{propulsion}$), a first non-propulsion power request ($P_{load1}$) and a second non-propulsion power request ($P_{load2}$). The controller may be configured to arbitrate the power distribution between the one or more recipients based in part on the total power demand ($P_D$) such that: $P_D = [P_{propulsion} + g_1(t)P_{load1} + g_2(t)P_{load2}]$, g being a component of the updated arbitration vector.

The controller may be configured to determine the real-time scaling factor $g_i(t)$ by maximizing a load reward function. The first non-propulsion power request may be directed to thermal regulation of the power sources and the second non-propulsion power request may be directed to respective power requests from a heating, ventilation and cooling (HVAC) unit in the vehicle.

The power sources may include a plurality of battery modules that may be charged by a charging source. The controller may be configured to arbitrate charging of the plurality of battery modules based in part on a charging reward function. The charging reward function is configured to minimize power loss based on the respective temperature and the respective state of charge of the plurality of battery modules. The controller may be configured to reconfigure the plurality of battery modules to a relatively higher power mode when the total power demand is at or above a predetermined threshold.

The above features and advantages and other features and advantages of the present disclosure are readily apparent from the following detailed description of the best modes for carrying out the disclosure when taken in connection with the accompanying drawings.

DETAILED DESCRIPTION

Figure 1:
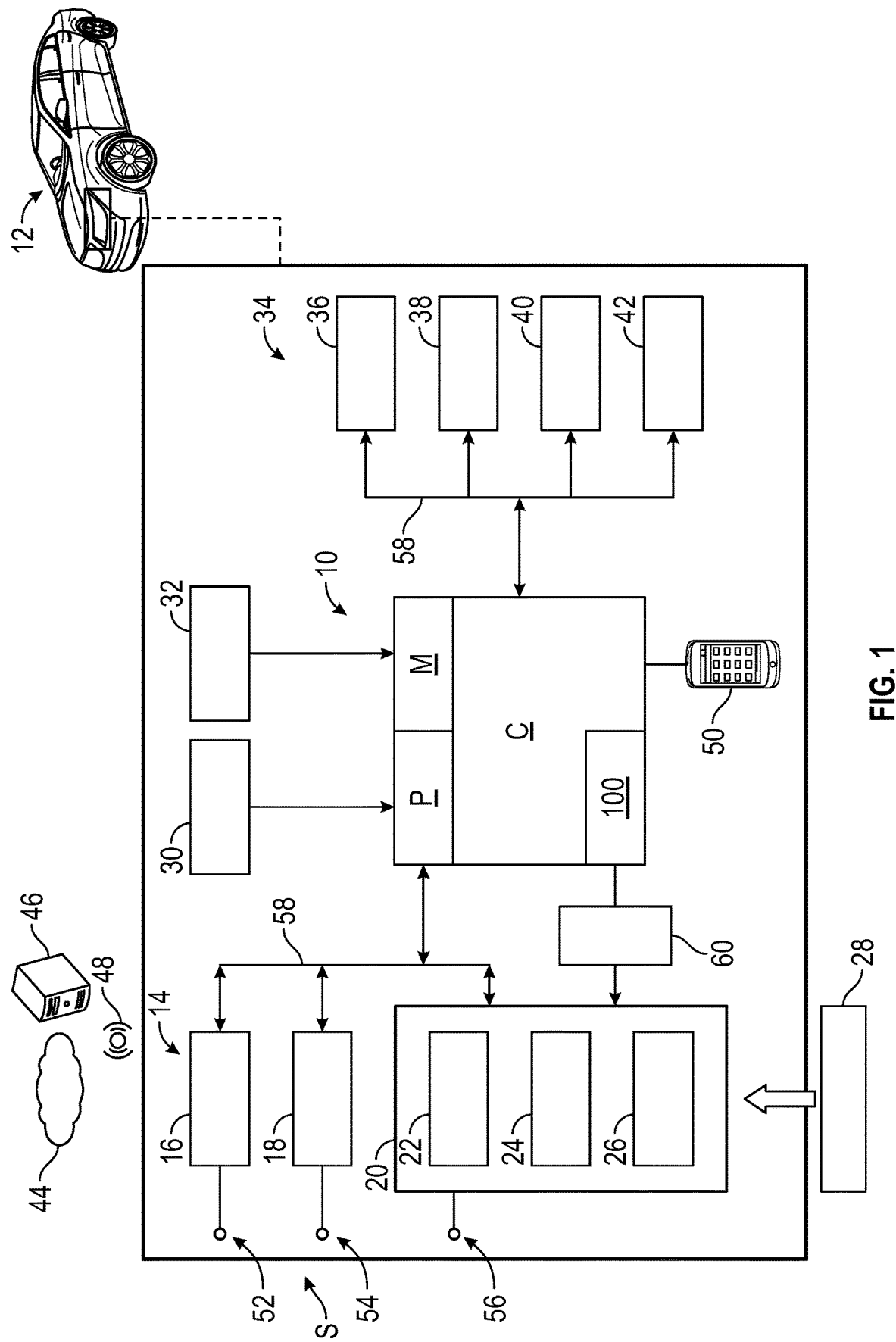
FIG. 1 is a schematic illustration of an energy management system for a vehicle having power sources, a controller and/or a mobile application.

Referring to the drawings, wherein like reference numbers refer to like components, FIG. 1 schematically illustrates an energy management system 10 for use in a vehicle 12 having one or more power sources 14 ("one or more" omitted henceforth). The vehicle 12 may be a mobile platform, such as, but not limited to, a passenger vehicle, sport utility vehicle, light truck, heavy duty vehicle, ATV, minivan, bus, transit vehicle, bicycle, moving robot, farm implement (e.g. tractor), sports-related equipment (e.g. golf cart), boat, plane and train. The vehicle 12 may be at least partially electric or fully electric. It is to be understood that the vehicle 12 may take many different forms and have additional components.

Referring to FIG. 1, the power sources 14 may include a supercapacitor 16 and a fuel cell 18. The fuel cell 18 may be configured to generate power using oxygen from an air inlet (not shown) and compressed hydrogen. The power sources 14 may include a plurality of battery modules 20, such as a first battery module 22, a second battery module 24 and third battery module 26. The plurality of battery modules 20 may be recharged through a charging source 28.

The energy management system 10 provides intelligent power arbitration, and includes computing a numerical score representing a reward for executing an action with a specific set of state variables. As will be described below, the energy management system 10 is configured to maximize a total reward, by adding the maximum reward attainable from future states to the reward for achieving the current state, thereby influencing the current action by the potential future reward. This potential reward is a weighted sum of the expected values of the rewards of the future steps starting from the current state.

Referring to FIG. 1, the energy management system 10 includes a controller C, which may be an integral portion of, or a separate module operatively connected to, other controllers of the vehicle 12. The controller C is configured to receive a total power demand ($P_D$) varying in real-time. The total power demand ($P_D$) may be generated by a program within the controller C, with external data. The total power demand ($P_D$) may be generated externally by a power module 30 and transmitted to the controller C. The total power demand ($P_D$) is based at least partially on requirements of one or more recipients 34 ("one or more" omitted henceforth) in the vehicle 12, including propulsion and non-propulsion recipients. Referring to FIG. 1, the recipients 34 may include a propulsion system 36 (defining the propulsion power request), a thermal regulation system 38, an HVAC (heating, ventilation and cooling) system 40 and a vehicle accessory system 42 for powering various accessories. The thermal regulation system 38 is configured to heat or cool the plurality of battery modules 20 and other power components of the vehicle 12, such as an inverter and an electric motor (not shown).

Referring to FIG. 1, the controller C may be configured to communicate with a remote server 46 and/or a cloud unit 44, via a wireless network 48, which may be a short-range network or a long-range network. The remote server 46 may be a private or public source of information maintained by an organization, such as for example, a research institute or a company. The cloud unit 44 may include one or more servers hosted on the Internet to store, manage, and process data. The controller C may be configured to receive and transmit wireless communication to the remote server 46 through a mobile application 50, shown in FIG. 1. The mobile application 50 may in communication with the controller C such that it has access to the data in the controller C. For example, the mobile application 50 may be embedded in a smart phone belonging to a user of the vehicle 12 and plugged or otherwise linked to the vehicle 12. The mobile application 50 may be physically connected (e.g. wired) to the controller C. Alternatively, the mobile application 50 may be embedded in the controller C. The circuitry and components of a mobile application 50 ("apps") available to those skilled in the art may be employed.

The wireless network 48 may be a Wireless Local Area Network (LAN) which links multiple devices using a wireless distribution method, a Wireless Metropolitan Area Networks (MAN) which connects several wireless LANs or a Wireless Wide Area Network (WAN) which covers large areas such as neighboring towns and cities. The wireless network 48 may be WIFI or a Bluetooth™ connection, defined as being a short-range radio technology (or wireless technology) aimed at simplifying communications among Internet devices and between devices and the Internet. Bluetooth™ is an open wireless technology standard for transmitting fixed and mobile electronic device data over short distances and creates personal networks, operating within the 2.4 GHz band. Other types of connections may be employed.

Referring to FIG. 1, the controller C may include a communications interface 32 enabling vehicle-to-vehicle (V2V), vehicle-to-everything (V2X) and other types of communication, such as V2I, V2N, V2V, V2P, V2D and V2G. The communication interface 32 may be configured to obtain future driving conditions, speed limits, traffic, GPS, topography information and other data that may be consumed by programs within the controller C and allow the controller C to project future power demands.

Referring to FIG. 1, the controller C includes at least one processor P and at least one memory M (or non-transitory, tangible computer readable storage medium) on which instructions are recorded for executing a method 100, described below with respect to FIG. 2. The method 100 uses a continually adjustable total power demand versus individual power arbitration profiles to learn and adapt to real-time variations. The method 100 provides a learning mechanism that may be initiated with offline calibration and optimized in real time. The memory M can store executable instruction sets, and the processor P can execute the instruction sets stored in the memory M.

The controller C is specifically configured to execute the blocks of method 100 and may receive input from one or more sensors S, such as first sensor 52, second sensor 54 and third sensor 56. The sensors S are configured to obtain respective sensor data relative to the power sources 14. The respective sensor data may relate to temperature, voltage, current, state of charge, capacity, state of health and other factors related to the power sources 14. The sensors S (and the plurality of recipients 34) may be in communication with the controller C via a communication BUS 58, which may be in the form of a serial Controller Area Network (CAN-BUS).

Figure 2:
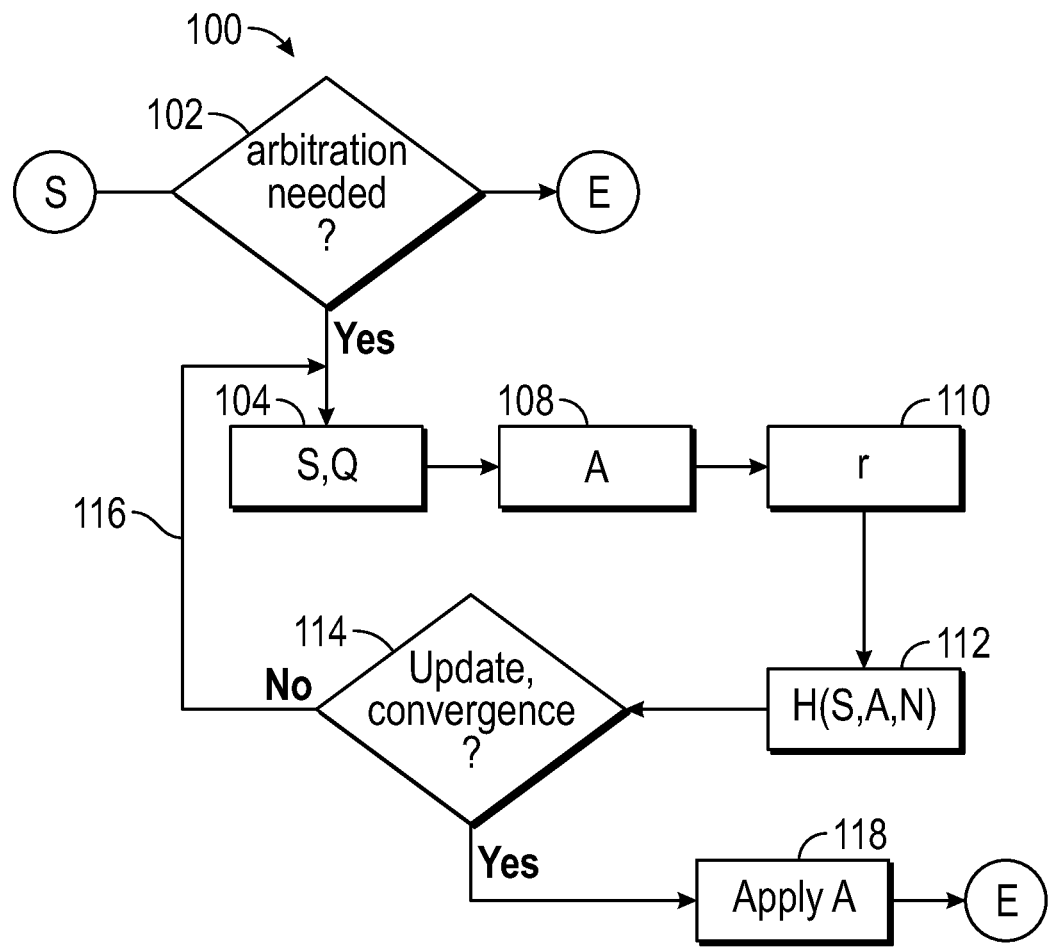
FIG. 2 is a schematic flow diagram of a method executable by the controller and/or mobile application of FIG. 1.

Referring now to FIG. 2, a flowchart of the method 100 is shown. Method 100 may be stored on and executable by at least one of the controller C and the mobile application 50 of FIG. 1. The method 100 need not be applied in the specific order recited herein and may be dynamically executed. Furthermore, it is to be understood that some steps may be eliminated. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. While the method 100 is described below with respect to the controller C, it is understood that the method 100 may be executed by the mobile application 50. The arbitration may split or distribute the total power demand to different units within the same source or to two sources with different characteristics. In other words, the method 100 may be applied with power sources 14 having multiple units with the same or complementary characteristics.

Per block 102 of FIG. 2, the controller C is configured to determine if power arbitration is needed or desired. For example, the controller C may be configured to determine if an enabling condition is met, e.g. a minimum value of the total power demand for triggering power arbitration. If so, the method 100 proceeds to block 104, where the controller C is configured to obtain a plurality of state variables, referred to herein as a state vector, based in part on the respective sensor data. If not, the method 100 ends. The state vector includes total power demand, and current status indicators of the power sources 14. Also, per block 102 of FIG. 2, the controller C is configured to select an initial transformation function. In one example, the initial transformation function is composed of multiple Poisson distribution functions.

The method 100 proceeds to block 108 from block 104, where the controller C is configured to determine an arbitration vector (A) based at least partially on the state vector (s) and the initial transformation function Q (s, A). The arbitration vector (A) is determined as one or more points for which the initial transformation function attains a maximum value $$[A = \arg\max_{A} Q(s, A)].$$

Here arg max is the set of points, x, for which f(x) attains the function's largest value.

Per block 110, the controller C is configured to determine a current reward based on the arbitration vector and the state vector. The current reward may be configured to minimize energy loss and maintain health of the power sources 14. Executing an action with a specific set of variables or state variables provides a reward, which is a numerical score that is employed by the controller C to optimize the process. The current reward may include a plurality of factors, such as an electrical loss factor ($E_{loss}$), a charge depletion factor ($\Delta SoC$), a capacity loss factor ($\Delta Q_{loss}$), and current limiting factor ($SL_{I_b}$). The charge depletion factor is defined as a difference between a final state of charge and an initial charge of the plurality of battery modules 20. The current reward (r) may include respective normalizing factors ($w_i$) for each of these terms such that the current reward (r) is determined as: $r=-(\omega_1 \cdot E_{loss}+\omega_2 \cdot \Delta Q_{loss}+\omega_3 \cdot \Delta SoC+\omega_4 \cdot SL_{I_b})$.

It is understood that some of the above terms may be omitted while others terms may be added and like battery diffusion loss, different efficiency terms or limits during charging vs discharging etc. The current limiting factor ($SL_{I_b}$) is based in part on a current to capacity ratio $$\left(\frac{I_b}{Q_b}\right),$$

defined by the plurality of battery modules 20, a first calibration parameter (m) and a second calibration parameter ($\overline{C}_{rate}$) such that $$SL_{I_b} = (|I_b/Q_b| - \overline{C}_{rate}) \cdot \left(\frac{|I_b/Q_b|}{\overline{C}_{rate}}\right)^m,$$

when $[|I_b/Q_b|>\overline{C}_{rate}]$ and $SL_{I_b}=0$, when $[|I_b/Q_b|<\overline{C}_{rate}]$. The current limiting factor ($SL_{I_b}$) is configured to penalize high current without putting a saturation or absolute limit. The second calibration parameter ($\overline{C}_{rate}$) helps to shape this penalty.

The capacity loss factor ($\Delta Q_{loss}$) may be obtained as a function of throughput in ampere-hours (Ah), state of charge ($SoC_i$), temperature ($T_b$) and a third calibration parameter (n):

$$\Delta Q_{loss} = \frac{\partial Q_{loss}}{\partial Ah} \cdot \Delta Ah = n \cdot f(SoC_i, T_b) \cdot Ah^{n-1} \cdot \Delta Ah$$

The calibration parameters may be obtained with data from an actual aging process in a test setting or lab. The calibration parameters may indicate how current battery operation adds to the long-term aging of the plurality of battery modules 20 as a reward signal for the optimization.

Figure 3:
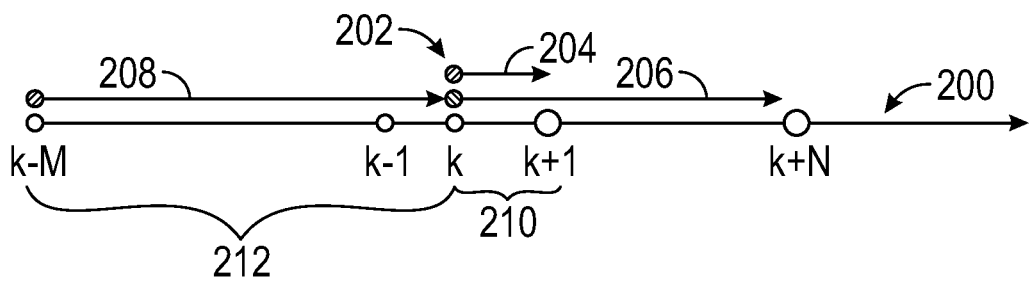
FIG. 3 is a schematic diagram of a timeline axis, illustrating a forecast window that may be employed in the method of FIG. 1.

The method 100 proceeds to block 112 from block 110. Per block 112 of FIG. 2, the controller C is configured to select a horizon size (N) and to determine a total reward ($s_k$, $A_k$, N) for the selected horizon size (N). The total reward ($s_k$, $A_k$, N) at a time step k is determined as a sum of the current reward r(s, A) and a forecasted reward over the horizon size (N), with s being the state vector and A being the arbitration vector. Referring to FIG. 3, a schematic diagram of a timeline axis 200 is shown, with location 202 indicating the time step k. Arrow 204 in FIG. 3 represents the current reward r(s, A), while arrow 206 represents the total reward H($s_k$, $A_k$,N) from time step k to (k+N). The controller C may be configured employ a forecast window 210, with the forecasted reward being determined as: $[\Sigma_{i=1}^{N-1} r(s_{k+i}, A_{k+i})]$. Thus, total reward ($s_k$, $A_k$,N)=[r(s, A)+$\Sigma_{i=1}^{N-1} r(s_{k+i}, A_{k+i})$].

Next, per block 114, the controller C is configured to obtain an updated transformation function. The updated transformation function [Q ($s_k$, $A_k$)] at the time step k may be based in part on the total reward H($s_k$, $A_k$,N) such that:

$$[Q(s_k, A_k) = H(s_k, A_k, N) Q(s_{k+N}, A_{k+N})].$$

In one example, the controller C is configured to selectively apply a calibrated discount factor (γ) to reduce an effect of the forecasted reward, the updated transformation function [Q ($s_k$, $A_k$)] at the timestep k being determined as:

$$\left[Q(s_k, A_k) = H(s_k, A_k, N) + \gamma \max_{a_{k+N}} Q(s_{k+N}, A_{k+N})\right].$$

In another example, the controller C is configured to selectively apply a calibrated discount factor ($\gamma$) and a calibrated robust learning rate ($\alpha$). The updated transformation function $[Q(s_k, A_k)]$ at a current iteration is based in part on the updated transformation function $[Q_-(s_k, A_k)]$ from a prior iteration such that:

$$Q(s_k, A_k) = [1-\alpha]Q_-(s_k, A_k)] + \alpha\left[H(s_k, A_k, N) + \gamma \max_{a_{k+N}} Q(s_{k+N}, A_{k+N})\right].$$

Alternatively, referring to FIG. 3, the controller C may be configured to employ a past data buffer window 212 in addition to the forecast window 210. Here, the controller C is configured to store the state vector and the arbitration vector at a current time step as buffered data. The updated transformation function $[Q(s_{k-M}, A_{k-M})]$ at a previous time step k-M is obtained using the total reward $H(s_{k-M}, A_{k-M})$ in the buffered data. Referring to FIG. 3, arrow 208 indicates the total reward $H(s_{k-M}, A_{k-M})$ from time step k to (k-M). As above, the forecasted reward over the selected horizon size (N) is obtained as $[\Sigma_{i=1}^{N-1} r(s_{k+i}, A_{k+i})]$. The updated transformation function $[Q(s_k, A_k)]$ at the current time step k is obtained as:

$$[Q(s_k, A_k) = r(s, A) + \Sigma_{i=1}^{N-1} r(s_{k+i}, A_{k+i}) + Q(s_{k-M}, A_{k-M})].$$

Additionally, per block 114 of FIG. 2, the controller C is configured to determine if there is sufficient convergence between the updated transformation at the current iteration and the previously obtained transformation function, which may be from a prior iteration or the initial transformation function. The threshold for convergence may be selected based on the application at hand. If the convergence is insufficient, as indicated by line 116, the method 100 loops to block 104 for further iterations and updating of the transformation function.

If there is sufficient convergence, the method 100 proceeds to block 118. Per block 118, an updated arbitration vector is obtained based at least partially on the updated transformation function. The controller C may be configured to arbitrate between the power sources 14 such that $(P_D = \Sigma a_i P_{S_i})$, with $P_D$ being the total power demand and a being a component of the updated arbitration vector $A = [a_i \ldots]$. As noted above, the total power demand may include respective power requests from the recipients 34, including a propulsion power request ($P_{propulsion}$), a first non-propulsion power request ($P_{load1}$) and a second non-propulsion power request ($P_{load2}$). The controller C may be configured to arbitrate between the recipients 34 based in part on the total power demand ($P_D$) such that: $P_D = [P_{propulsion} + g_1(t)P_{load1} + g_2(t)P_{load2}]$ and g being another component of the updated arbitration vector A. The updated arbitration vector may be defined as $A = [a_i \ldots g_i]$.

The method 100 may be employed to arbitrate between multiple power sources 14 and multiple recipients 34. However, it is understood that the method 100 may be employed to arbitrate between a single power source 14 and multiple recipients 34 as well as arbitrate between multiple power sources 14 and a single recipient 34, in an integrated framework (e.g. deliver the propulsion demand in an optimal way while modulating individual power source (via the first component a) and demands (via the second component g) in real-time, as indicated below.

$$P_D = \Sigma a_i P_{S_i} = [P_{propulsion} + g_1(t)P_{load1} + g_2(t)P_{load2}].$$

$$P_D = \Sigma a_i P_{S_i} = P_{propulsion} + \Sigma g_i P L_i, P_{propulsion} = \Sigma a_i P_{S_i} - \Sigma g_i P L_i$$

For example, if the vehicle 12 is being driven on a hilly road with high total power demand, the vehicle cabin may be precooled ($g_2 > 1$ dynamically) or the demand from the HVAC unit tapered in anticipation of uphill demand ($g_2 < 1$ dynamically). In another example, the plurality of battery modules 20 may be pre-cooled ($g_1 > 1$) to a greater degree to prepare for increased load demands as a function of anticipated higher propulsion demand. In another example, the preheating of particular modules in the plurality of battery modules 20 at cold temperatures during vehicle startup may be met by scaling power requests from other auxiliary recipients as a function of individual pack temperatures.

Additionally, the controller C may be configured to arbitrate charging of the plurality of battery modules 20 based in part on a charging reward function. The charging reward function is configured to minimize power loss based on the respective temperature and the respective state of charge of the plurality of battery modules 20, when the total power demand is at or above a predetermined threshold. The controller C may be configured to reconfigure the plurality of battery modules 20, via a reconfiguration module 60, to a relatively higher power mode from a relatively lower power mode. The charging reward function (CR) may include an electrical loss factor ($E_{loss}$), a capacity loss factor ($\Delta Q_{loss}$) and a charge depletion factor ($\Delta SoC$) in the plurality of battery modules 20, such that: $CR = -(\omega_1 \cdot E_{loss} + \omega_2 \cdot \Delta Q_{loss} + \omega_3 \cdot \Delta SoC)$. Similarly, the power distribution may be based on the current state-of-charge and temperature of individual ones of the plurality of battery modules 20, providing more power to the modules with lower state of charge and temperatures.

In one example, to further the learning process, a random value of the arbitration vector (A) is employed at preselected and/or random times, for example, random values chosen 5% of the time and obtained as described above for the remaining 95% of the time. Additionally, this learning may be employed during a pre-production calibration process where the method 100 serves as a data-driven calibration tool. The method 100 may be employed during normal operation to further adapt and optimize to present conditions.

The method 100 may incorporate a "preview" feature whereby the projected information (e.g. from the communications interface 32) may be incorporated, such as through the forecasted reward, as future power demands in the overall optimization framework. This will allow synchronization of current and future power demands. For example, the respective power request from the HVAC system 40 may be synchronized with an upcoming propulsion power demand: preheat or precool cabin (HVAC load) with "preview" on an upcoming hill. In other words, the overall HVAC demand may be delivered by sending more power to the HVAC system 40 when the propulsion demand is low, and less when the propulsion demand is high, effectively preventing power spikes in the requested battery power, thereby helping to reduce long-term battery aging.

In summary, the energy management system 10 provides a host of advantages: improved energy efficiency, range extension for the vehicle 12 and prolonged battery life. The energy management system 10 allows for blending of energy consumption optimization and long-term component health in real-time. Accordingly, the energy management system 10 improves the functioning of the vehicle 12.

The flowchart in FIG. 2 illustrate an architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based energy management systems that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram blocks.

The controller C includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic media, a CD-ROM, DVD, other optical media, punch cards, paper tape, other physical media with patterns of holes, a RAM, a PROM, an EPROM, a FLASH-EEPROM, other memory chips or cartridges, or other media from which a computer can read.

Look-up tables, databases, data repositories or other data stores described herein may include various kinds of mechanisms for storing, accessing, and retrieving various kinds of data, including a hierarchical database, a set of files in a file energy management system, an application database in a proprietary format, a relational database energy management energy management system (RDBMS), etc. Each such data store may be included within a computing device employing a computer operating system such as one of those mentioned above and may be accessed via a network in one or more of a variety of manners. A file system may be accessible from a computer operating energy management system and may include files stored in various formats. An RDBMS may employ the Structured Query Language (SQL) in addition to a language for creating, storing, editing, and executing stored procedures, such as the PL/SQL language mentioned above.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. An energy management system for a vehicle, the energy management system comprising:
   one or more power sources configured to provide power for one or more recipients;
   one or more sensors configured to obtain respective sensor data relative to the one or more power sources;
   a controller in communication with the one or more sensors and having a processor and tangible, non-transitory memory on which instructions are recorded, execution of the instructions by the processor causing the controller to:
      obtain a state vector based in part on the respective sensor data and select an initial transformation function, the state vector including a total power demand;
      determine an arbitration vector based at least partially on the state vector and the initial transformation function, the arbitration vector being determined as one or more points for which the initial transformation function attains a maximum value;
      determine a current reward based on the arbitration vector and the state vector;
      determine a total reward as a sum of the current reward and a forecasted reward over a selected horizon size;
      determine an updated transformation function based at least partially on the initial transformation function and the total reward;
      obtain an updated arbitration vector based at least partially on the updated transformation function; and
   wherein the controller is configured to arbitrate a power distribution based in part on the updated arbitration vector.

2. The energy management system of claim 1, wherein:
   the current reward is configured to minimize energy loss in the one or more power sources, the one or more power sources each providing a respective power ($P_{S_i}$); and
   the controller is configured to arbitrate between the one or more power sources such that ($P_D = \Sigma a_i P_{S_i}$), with $P_D$ being the total power demand and a being a component of the updated arbitration vector.

3. The energy management system of claim 2, wherein:
   the one or more power sources include at least one battery module; and
   the current reward is configured to minimize an electrical loss factor, a capacity loss factor and a charge depletion factor, the charge depletion factor being defined as a difference between a final state of charge and an initial charge of charge of the at least one battery module.

4. The energy management system of claim 2, wherein:
   the one or more power sources include at least one battery module defining a current to capacity ratio ($I_b/Q_b$); and
   the current reward includes a current limiting factor ($SL_{I_b}$) based in part on the current to capacity ratio $$\left(\frac{I_b}{Q_b}\right),$$

a first calibration parameter (m) and a second calibration parameter ($\overline{C}_{rate}$), such that $SL_{I_b}=0$, when $[|I_b/Q_b|<\overline{C}_{rate}]$ and $$SL_{I_b} = (|I_b/Q_b| - \overline{C}_{rate}) \cdot \left(\frac{|I_b/Q_b|}{\overline{C}_{rate}}\right)^m, \text{ when } [|I_b/Q_b| > \overline{C}_{rate}].$$

5. The energy management system of claim 4, wherein:
the current reward includes respective normalizing factors ($w_i$) for an electrical loss factor ($E_{loss}$), a capacity loss factor ($\Delta Q_{loss}$), a current limiting factor ($SL_{I_b}$) and a charge depletion factor ($\Delta SoC$) such that the current reward (r) is determined as: $r=-(\omega_1 \cdot E_{loss}+\omega_2 \cdot \Delta Q_{loss}+\omega_3 \cdot \Delta SoC+\omega_4 \cdot SL_{I_b})$.

6. The energy management system of claim 1, wherein:
the total reward at a time step k is determined as a sum of the current reward and a forecasted reward over the selected horizon size; and
the updated transformation function at the time step k is based in part on the total reward at the time step k.

7. The energy management system of claim 1, wherein:
the controller is configured to selectively apply a calibrated discount factor and a calibrated robust learning rate; and
the updated transformation function at a current iteration is based in part on the updated transformation function from a prior iteration, the calibrated discount factor and the calibrated robust learning rate.

8. The energy management system of claim 1, wherein the controller is configured to:
store the state vector and the arbitration vector at a current time step as buffered data;
obtain the updated transformation function at a previous time step (k−M) based in part on the total reward in the buffered data;
determine the forecasted reward over the selected horizon size (N); and
obtain the updated transformation function at a current time step k based in part on the forecasted reward and the current reward.

9. The energy management system of claim 1, wherein:
the total power demand includes respective power requests from the one or more recipients, including a propulsion power request ($P_{propulsion}$); a first non-propulsion power request ($P_{load1}$) and a second non-propulsion power request ($P_{load2}$);
the controller is configured to arbitrate the power distribution between the one or more recipients based in part on the total power demand ($P_D$) such that: $P_D=[P_{propulsion}+g_1(t)P_{load1}+g_2(t)P_{load2}]$, g being a component of the updated arbitration vector.

10. The energy management system of claim 9, wherein the vehicle includes a heating, ventilation and cooling (HVAC) unit, and wherein:
the first non-propulsion power request is directed to thermal regulation of the one or more power sources and the second non-propulsion power request is from the HVAC unit.

11. The energy management system of claim 1, wherein:
the one or more power sources include a plurality of battery modules configured to be charged by a charging source, the plurality of battery modules being reconfigurable between a relatively higher power mode and a relatively lower power mode;
the plurality of battery modules is characterized by a respective temperature and a respective state of charge;
the controller is configured to determine a charging reward function for minimizing power loss at a current time step, based at least partially on the respective temperature and the respective state of charge of the plurality of battery modules; and
the controller is configured to arbitrate charging of the plurality of battery modules based in part on the charging reward function and reconfigure the plurality of battery modules to the relatively higher power mode when the total power demand is at or above a predetermined threshold.

12. A method of operating an energy management system for a vehicle having one or more sensors and a controller with a processor and tangible, non-transitory memory, the method comprising:
configuring one or more power sources to supply power to the vehicle;
obtaining respective sensor data relative to the one or more power sources, via the one or more sensors;
determining, via the controller:
a state vector based in part on the respective sensor data, the state vector including a total power demand;
an arbitration vector based at least partially on the state vector and an initial transformation function, the arbitration vector being determined as one or more points for which the initial transformation function attains a maximum value;
a current reward based on the arbitration vector and the state vector, the current reward being configured to minimize energy loss in the one or more power sources;
a total reward as a sum of the current reward and a forecasted reward over a selected horizon size;
an updated transformation function based at least partially on the initial transformation function and the total reward;
an updated arbitration vector based at least partially on the updated transformation function; and
arbitrating a power distribution based in part on the updated arbitration vector.

13. The method of claim 12, wherein the one or more power sources include at least one battery module, further comprising:
obtaining a current limiting factor ($SL_{I_b}$) based in part on a current to capacity ratio $$\left(\frac{I_b}{Q_b}\right)$$

defined by the at least one battery module, a first calibration parameter (m) and a second calibration parameter ($\overline{C}_{rate}$), such that $SL_{I_b}=0$, when $$[|I_b/Q_b| < \overline{C}_{rate}] \text{ and } SL_{I_b} = (|I_b/Q_b| - \overline{C}_{rate}) \cdot \left(\frac{|I_b/Q_b|}{\overline{C}_{rate}}\right)^m,$$

when $[|I_b/Q_b|>\overline{C}_{rate}]$; and
including the current limiting factor ($SL_{I_b}$) in the current reward.

14. The method of claim 13, wherein determining the current reward includes:

obtaining an electrical loss factor ($E_{loss}$), a capacity loss factor ($\Delta Q_{loss}$) and a charge depletion factor ($\Delta SoC$), the charge depletion factor being defined as a difference between a final state of charge and an initial charge of charge of the at least one battery module; and obtaining respective normalizing factors ($w_i$) for the electrical loss factor ($E_{loss}$), the capacity loss factor ($\Delta Q_{loss}$), the current limiting factor ($SL_{I_b}$) and the charge depletion factor ($\Delta SoC$) such that the current reward (r) is determined as: $r = -(\omega_1 \cdot E_{loss} + \omega_2 \cdot \Delta Q_{loss} + \omega_3 \cdot \Delta SoC + \omega_4 \cdot SL_{I_b})$.

15. The method of claim 12, wherein obtaining the updated transformation function includes:

determining the total reward at a time step k is as a sum of the current reward and a forecasted reward over the selected horizon size; and obtaining the updated transformation function at the time step k based in part on the total reward.

16. The method of claim 12, further comprising:

applying a calibrated discount factor to reduce an effect of the forecasted reward and a calibrated robust learning rate; and obtaining the updated transformation function at a current iteration based in part on the updated transformation function from a prior iteration, the calibrated discount factor and the calibrated robust learning rate.

17. The method of claim 12, wherein obtaining the updated transformation function includes:

storing the state vector and the arbitration vector at a current time step as buffered data;

obtaining the updated transformation function at a previous time step using the buffered data;

determining a forecasted reward over the selected horizon size.

* * * * *